United States Patent
Noll

[11] Patent Number: 6,004,001
[45] Date of Patent: Dec. 21, 1999

[54] ILLUMINATION FOR A DISPLAY

[75] Inventor: Heinrich Noll, Gross-Umstadt, Germany

[73] Assignee: VDO Adolf Schindling AG, Frankfurt, Germany

[21] Appl. No.: 08/920,251

[22] Filed: Jun. 3, 1997

[30] Foreign Application Priority Data

Sep. 12, 1996 [DE] Germany ............... 196 37 087

[51] Int. Cl.$^6$ .................................. G01D 11/28
[52] U.S. Cl. ................ 362/30; 362/84; 362/293; 362/800; 116/288; 116/DIG. 6; 116/DIG. 36
[58] Field of Search .......... 116/286–288, DIG. 36, 116/DIG. 6; 40/542; 362/84, 23, 29, 30, 293, 85, 800

[56] References Cited

U.S. PATENT DOCUMENTS

| | | | |
|---|---|---|---|
| 2,455,951 | 12/1948 | Roper et al. | 362/84 |
| 3,510,732 | 5/1970 | Amans | 313/501 |
| 4,044,708 | 8/1977 | Klein | 116/286 |
| 4,754,202 | 6/1988 | Havel | 313/500 |
| 4,779,166 | 10/1988 | Tanaka et al. | 362/84 |
| 5,260,625 | 11/1993 | Holden et al. | 313/501 |
| 5,320,063 | 6/1994 | Ogura et al. | 116/288 |

FOREIGN PATENT DOCUMENTS

| | | |
|---|---|---|
| 0351259 | 1/1990 | European Pat. Off. |
| 0692406 | 1/1996 | European Pat. Off. |
| 4311018 | 10/1994 | Germany |
| 4431667 | 3/1996 | Germany |
| 8404382 | 11/1984 | WIPO |

OTHER PUBLICATIONS

Patent Abstracts of Japan, Publication No. JP8007614, Publication Date Jan. 26, 1996, vol. 96, No. 5, May 31, 1996 (Nichiachem Ind. Ltd).

Patent Abstracts of Japan, Publication No. JP57169282, Publication Date Oct. 18, 1982, vol. 7, No. 13 (E–153), Jan. 19, 1983, (Mitsubishi Denki KK).

Patent Abstracts of Japan, Publication No. JP8064860, Publication Date Mar. 8, 1996, vol. 96, No. 7, Jul. 31, 1996, (Mitsubishi Materials Corp).

*Primary Examiner*—Alan Cariaso
*Attorney, Agent, or Firm*—Martin A. Farber

[57] ABSTRACT

An illumination for a display and/or a part of a display in an illumination color with a display and/or a part of a display which can be transilluminated by a source of light of a different color than the illumination color. The source of light is arranged on the side of the display and/or the part of the display facing away from an observer and a color filter 5 is arranged between source of light and the display and/or a part of the display. The color filter 5 is a split filter through which a part of the light from the source of light can pass unfiltered and a further part of the light from the source of light can pass filtered.

14 Claims, 5 Drawing Sheets

ILLUMINATION FOR A DISPLAY

FIELD AND BACKGROUND OF THE INVENTION

The present invention relates to an illumination for a display or a part of a display, in an illumination color, the display or display part being transilluminatable by a source of light of a color other than the illumination color, the source of light being arranged on a side of the display or display part facing away from an observer, and wherein a color filter is arranged between the source of light and the display or display part.

In such illuminations, it is known to produce the illumination color in which the display or the display part is to appear by mixing the colors of light of the source of light and of the color filter.

In order to obtain precisely the blended color desired, a tedious adjustment of, for instance, the control currents for the source of light is necessary. Furthermore, the color filter results in a substantial loss in the intensity of illumination.

SUMMARY OF THE INVENTION

Therefore, the object of the present invention is to provide an illumination of the aforementioned type by which a precisely determinable illumination color can be obtained at little expense without a loss or even with an increase in the intensity of illumination.

This object is achieved in accordance with the invention in the manner that the color filter is a split filter through which one part of the light from source of light can pass unfiltered and a further part of the light from the source of light can pass filtered. By blending the unfiltered portion of the light with the filtered portion of the light, the illumination color can be obtained in simple manner.

If the color filter is a filter which emits the filtered portion of the light, in particular a fluorescence filter through which the filtered portion of the light can be emitted, then the loss of intensity of illumination is particularly slight.

In order, when using only a single source of colored light, to obtain the illumination color white, the color places of the colors of the source of light and of the color of the filtered portion of the light can lie, in the standard chromaticity diagram, on opposite sides of the achromatic point on an approximately linear connecting line intersecting the achromatic region.

In this connection, the source of light can, in cost-favorable manner, be a light-emitting diode (LED).

If the source of light is an surface mounted device (SMD) light-emitting diode, it can be arranged and contacted on a circuit board in one operation with the electric or electronic parts.

A reduction in the number of parts and thus in the required construction space is obtained by providing that the light emitting diode is a LED chip arranged in a housing, the LED chip being covered towards the side of the observer by a color-transparent or color-translucent material which forms the color filter.

In this connection, the color transparent or color lucent material can preferably be a colored epoxy resin.

The color of the source of light is preferably of shorter wavelength than the color of the filtered portion of light. In this way, the visual light intensity of the blended light, as compared with the light from the source of light, can be increased.

The display or display part can consist of a transparent material, in which case the display can be a transilluminatable display panel, and the portion of the display can be a point of a pointer instrument.

Another possibility consists therein that the display panel be a transmissively transilluminatable liquid crystal display.

BRIEF DESCRIPTION OF THE DRAWINGS

With the above and other objects and other advantages in view, the present invention will become more clearly understood in connection with the detailed description of a preferred embodiment, when considered with the accompanying drawings of which.

Embodiments of the invention are shown in the drawing, in which.

DETAILED DESCRIPTION OF THE PREFERRED EMBODIMENT

Figure 1:
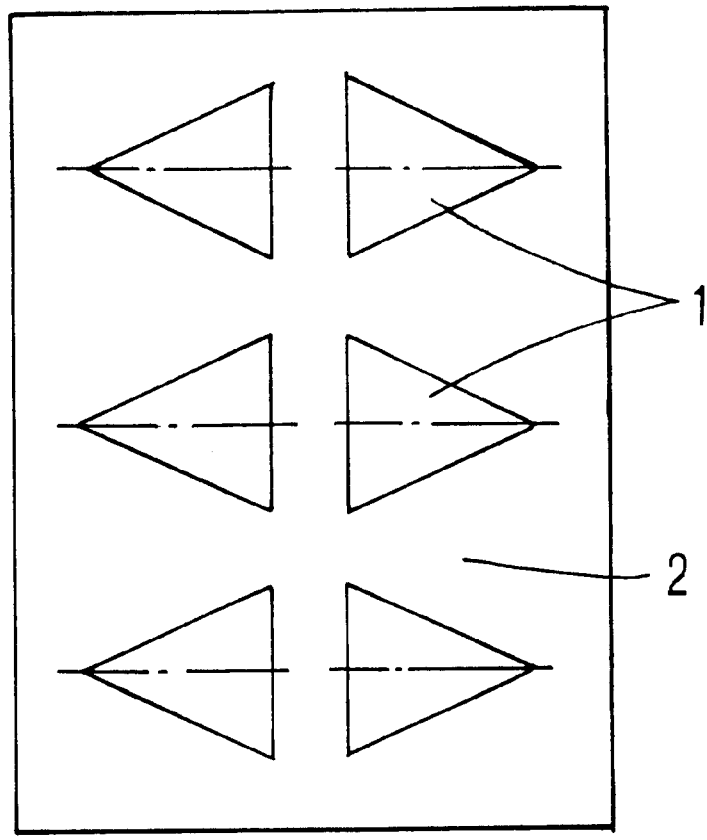
FIG. 1 is a view of a display.
Figure 2:
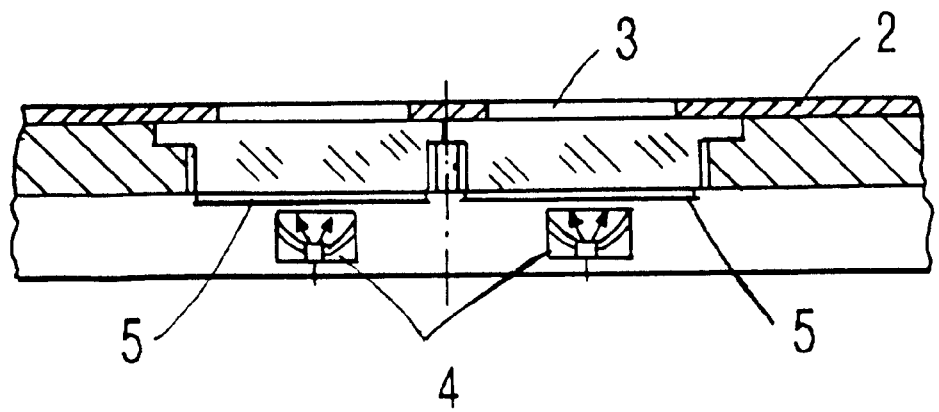
FIG. 2 is a cross section through the display shown in FIG. 1.

The display shown in FIGS. 1 and 2 has six display panels 1, which may be liquid crystal display (LCD) panels, consisting of a transparent material which is arranged on an opaque display board 2. Behind each display panel 1, there is a light-emitting diode 4 for producing colored light, specifically blue light.

Between each light-emitting diode 4 and the display panel 1 associated with it, there is a color filter 5. The color filter 5 is a fluorescence filter which is a split filter and emits a part of the light from the light-emitting diode 4 unfiltered and a further part of the light from the light-emitting diode 4 absorbed and emitted again at a longer wavelength.

Figure 3:
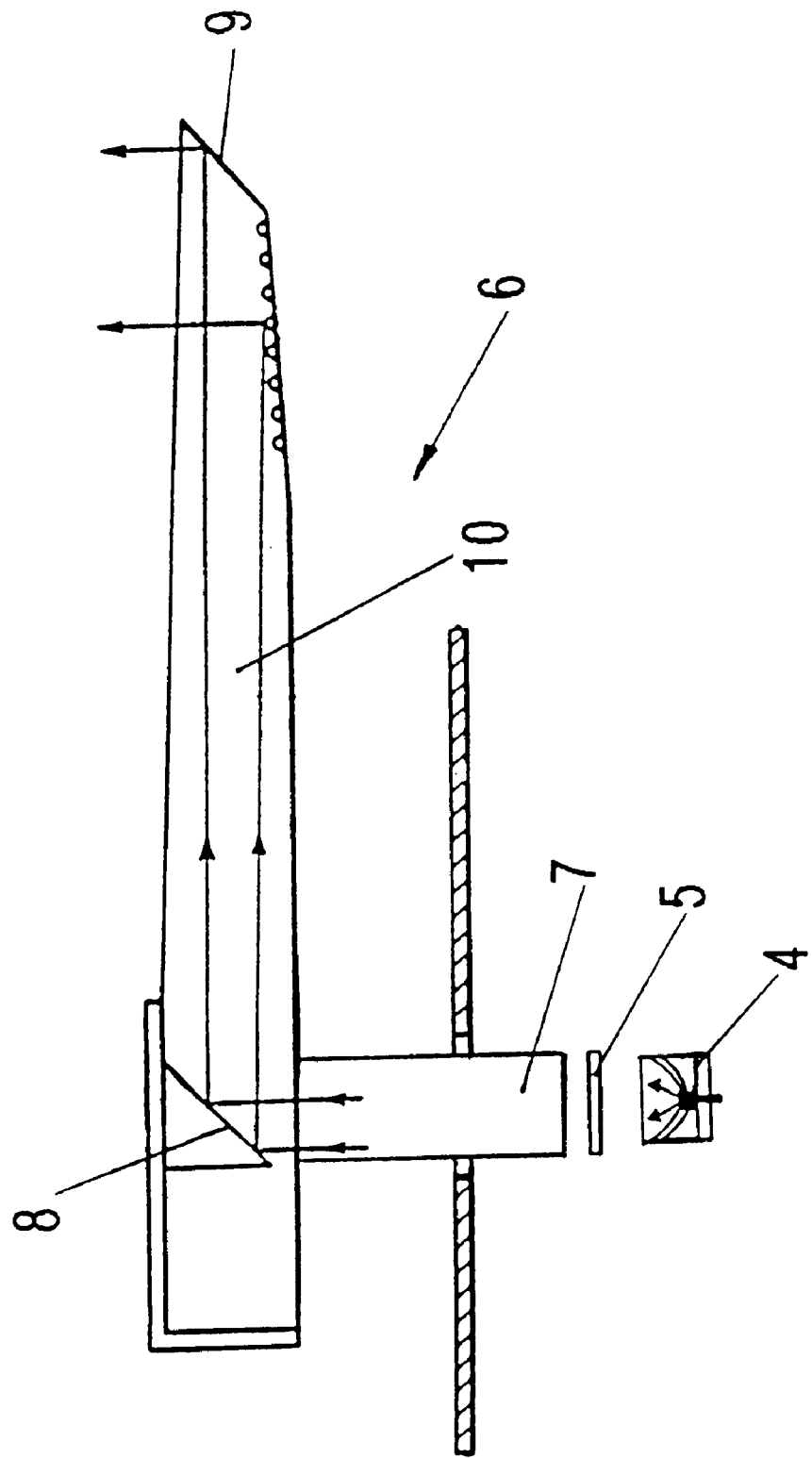
FIG. 3 is a side view of a pointers.

In FIG. 3 there is shown a pointer 6 of a pointer instrument which comprises a transparent material, and has a pointer hub 7 which also comprises transparent material and into which light from a light-emitting diode 4 can also be coupled via a color filter 5. The light coupled into the pointer hub 7 is deflected into the pointer arm 10 towards the pointer tip 9 by a deflection surface 8 of the pointer 6. The deflection surface 8 is inclined to an axis of the pointer hub 7.

On a surface of the pointer arm 10 facing away from the observer, there is a further deflection of the light towards the observer.

The color filter 5 and the light-emitting diode 4 in FIG. 3 are of the same nature as the color filters 5 and light-emitting diodes 4 of FIGS. 1 and 2.

Figure 5:
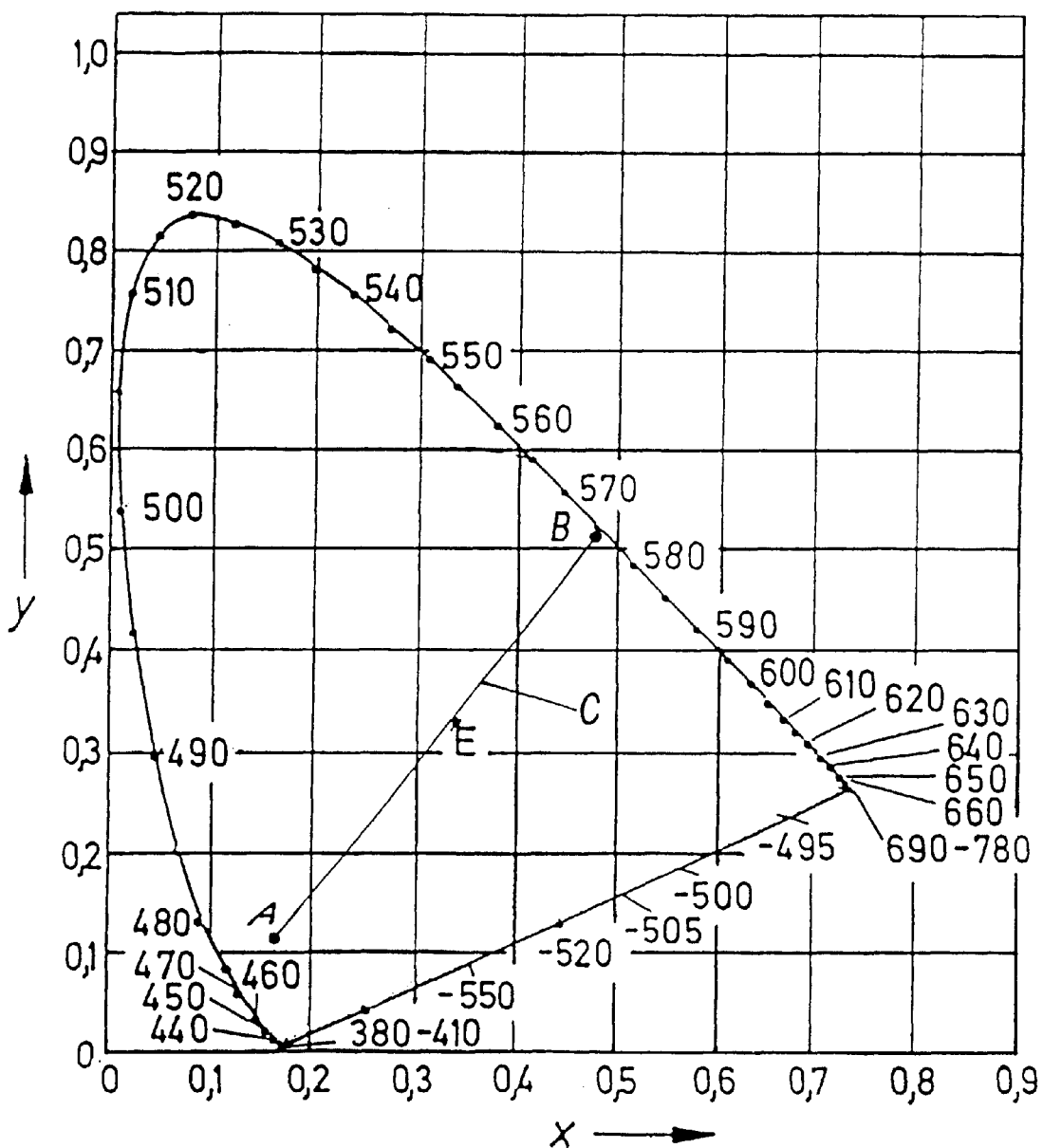
FIG. 5 is the standard chromaticity diagram.

In the standard chromaticity diagram in FIG. 5, the color points of the color of the light-emitting diode 4 are indicated by "A" and of the color of the portion of light filtered by the color filter 5 and emitted as indicated by "B". The color points are connected by a straight line "C". The straight line "C" passes through the achromatic point "E" of the standard chromaticity table.

Figure 4:
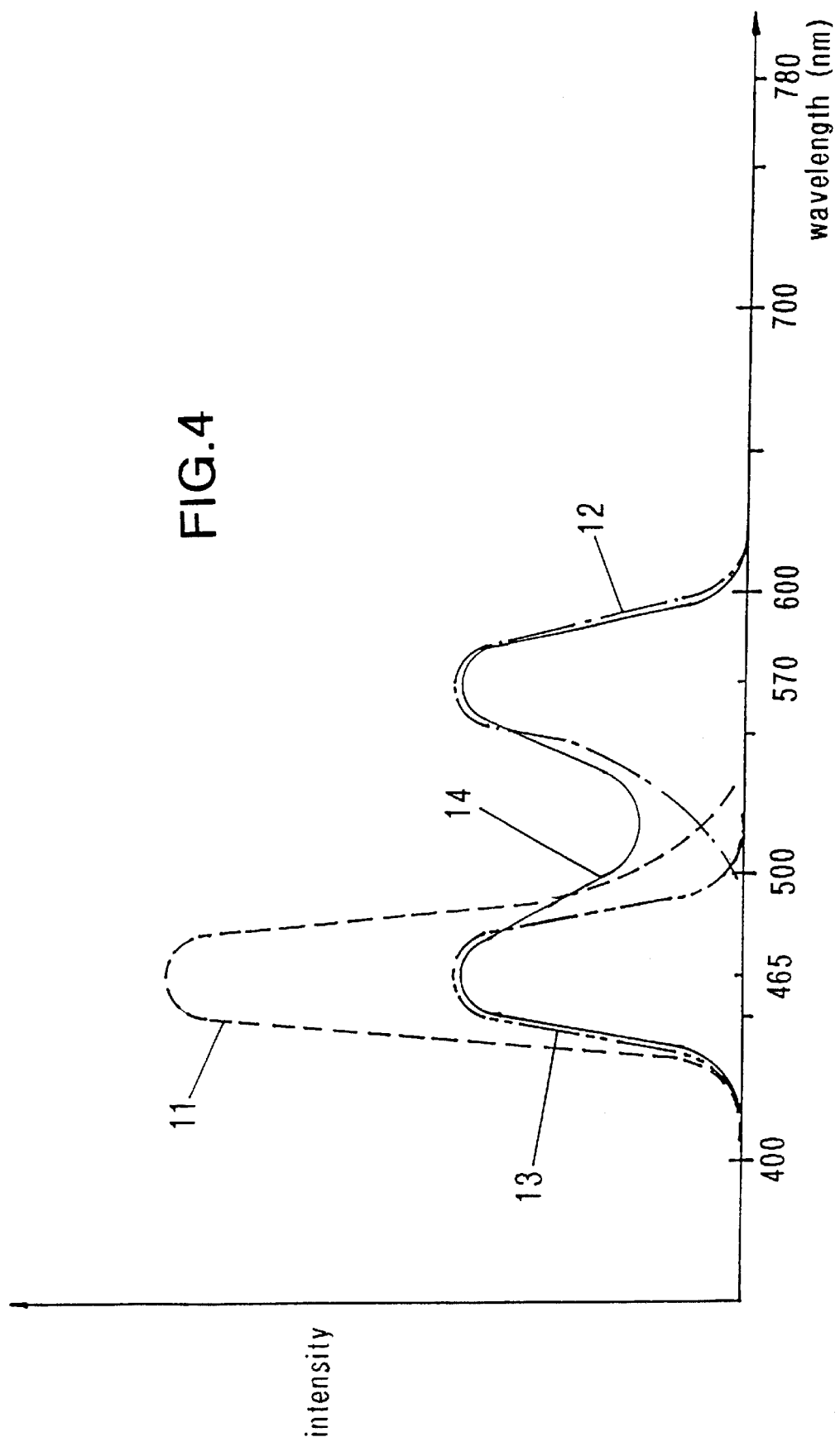
FIG. 4 is a graph of intensity versus wavelength.

In the graph of FIG. 4, the spectrum of the color of the light-emitting diode 4 (blue) is shown by dashed line 11 and the spectrum of the color of the portion of the light absorbed by the color filter, developed as fluorescent filter, and emitted again at a longer wavelength (yellow-green) is shown in dash-dot line 12. The diode 4 may be an SMD light-emitting diode.

The unfiltered portion of the light from the light-emitting diode 4 (blue) is shown by dash-dot-dot line 13. By the absorption of a part of the light of the color of the light-emitting diode 4, there is a reduction in the energy and thus in the intensity of the remaining unabsorbed portion of light from the light-emitting diode 4.

By the continuous line 14 there is shown the resultant spectrum of the unabsorbed portion of light (line 13) and of the absorbed portion of light (line 12) which is absorbed and then emitted with a longer wavelength.

Since, as shown in FIG. 5, the color points of the non-absorbed portion of light "A" and of the portion of light "B" which is absorbed and then emitted lie on different sides of the achromatic point "E", and the line "C" connecting them intersects the achromatic point "E", the color of the resultant spectrum, and thus the illumination color of the display panel 1 and of the pointer 8, is white.

Figure 6:
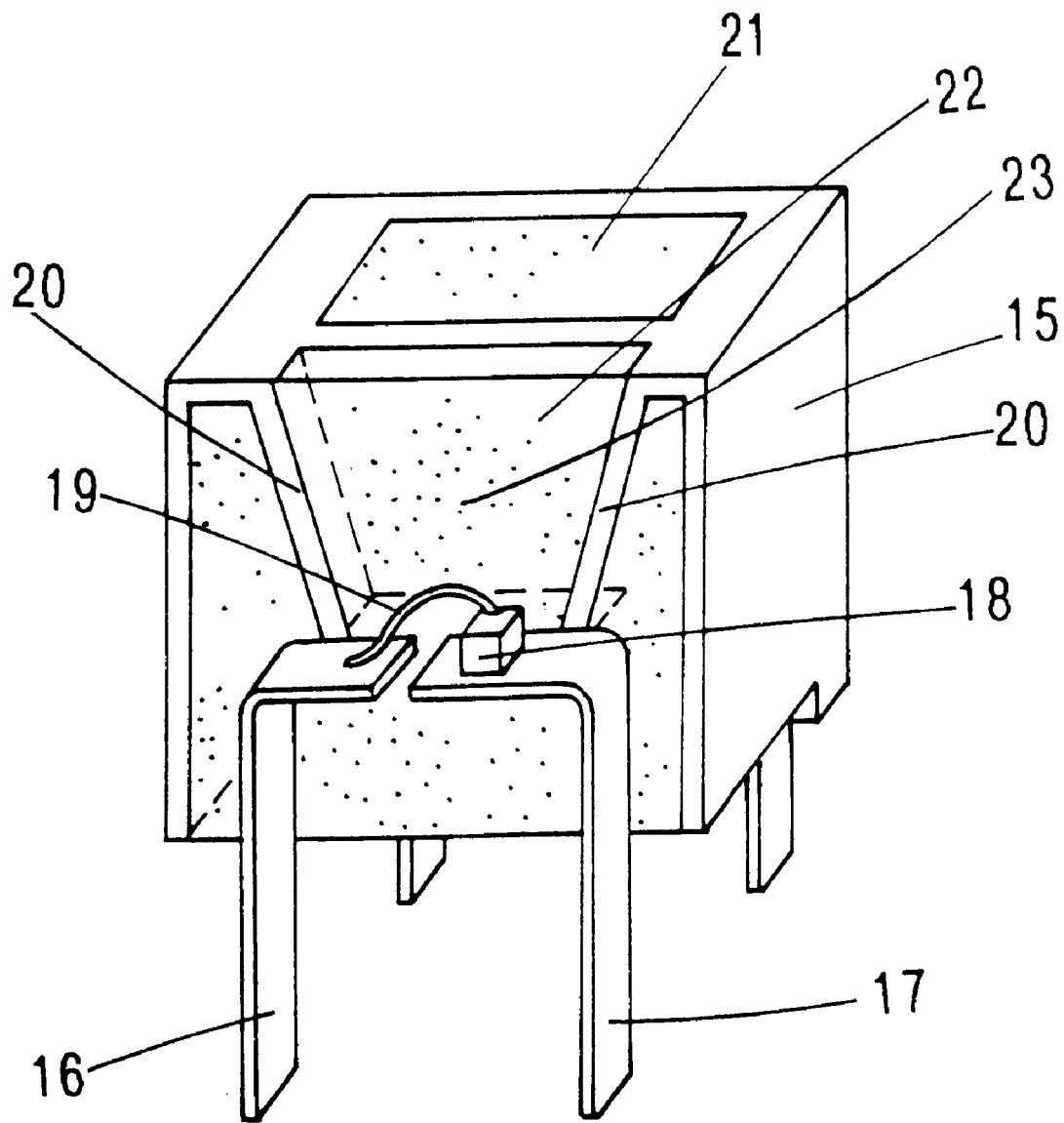
FIG. 6 is a perspective view of a light-emitting diode.

The light-emitting diode assembly shown in FIG. 6 consists of a housing 15 into which an anode connection 16 and a cathode connection 17 pass from the outside parallel to each other. The ends of the connections within the housing 15 are bent towards each other. On the bent end of the cathode connection 17 there is arranged a LED chip 18 which is conductively connected by a contact wire 19 to the bent end of the anode connection 16. Starting from the region of the LED chip 18, reflection surfaces 20 extend, diverging from each other, up to an observer-side opening 21 in the housing 15. The entire housing is filled with an epoxy resin 22 which contains colored fluorescence particles 23 mixed therein and thus forms a fluorescent filter for the light emitted by the LED chip 18.

I claim:

1. An illumination system for a display in an illumination color, the system comprising:
    a display, a color filter, and a source of light of a color different from the illumination color; wherein
        said source of light is disposed on a side of the display facing away from an observer, said display being transilluminatable by said source; and
        said color filter is arranged between the source of light and the display, and comprises a split filter allowing a first part of the light from the source of light to pass unfiltered at a first wavelength and a second part of the light of the source of light to pass filtered at a second wavelength different from the first wavelength, the light of said first part and the light of said second part being blended to provide a derived illumination color.

2. Illumination according to claim 1, wherein
    said color filter provides for a conversion of said light from said light source at said first wavelength to light at said second wavelength, said second wavelength being longer than said first wavelength; and
    the color filter emits the filtered part of the light at a longer wavelength.

3. Illumination according to claim 2, wherein the color filter is a fluorescence filter enabling emission of the filtered portion of the light.

4. Illumination according to claim 2, wherein, in the standard form of a chromaticity table, a first color point (A), and a second color point (B), respectively, of the color of the source of light and the color of the filtered portion of the light lie on opposite sides of an achromatic point (E) on an approximately linear connecting line (C) between the point A and the point B, which line intersects the achromatic region.

5. Illumination according to claim 1, wherein the source of light is a light-emitting diode.

6. Illumination according to claim 5, wherein the source of light is a surface-mounted device light-emitting diode.

7. Illumination according to claim 6, further comprising a housing enclosing said light source, and wherein the color filter is connected to said housing, and comprises an optical material which is color transparent or color translucent; and
    wherein the light-emitting diode is an LED chip disposed within the housing, the LED chip being covered towards an observer side by the optical material.

8. Illumination according to claim 7, wherein the optical material is a colored epoxy resin.

9. Illumination according to claim 2, wherein
    said color filter provides for a conversion of said light from said light source at said first wavelength to light at said second wavelength, and the color of the source of light is of shorter wavelength than the color of the filtered portion of light.

10. Illumination according to claim 1, wherein the display comprises a transparent material.

11. Illumination according to claim 1, wherein the display comprises a translucent display panel.

12. Illumination according to claim 1, wherein the display comprises a pointer of a pointer instrument.

13. Illumination according to claim 1, wherein the display comprises a panel of a transmissively translucent liquid crystal display.

14. Illumination according to claim 1, wherein the display is a part of a larger display assembly.

* * * * *